G. F. J. COLBURN.
BIRD-CAGE.
No. 177,924. Patented May 30, 1876.
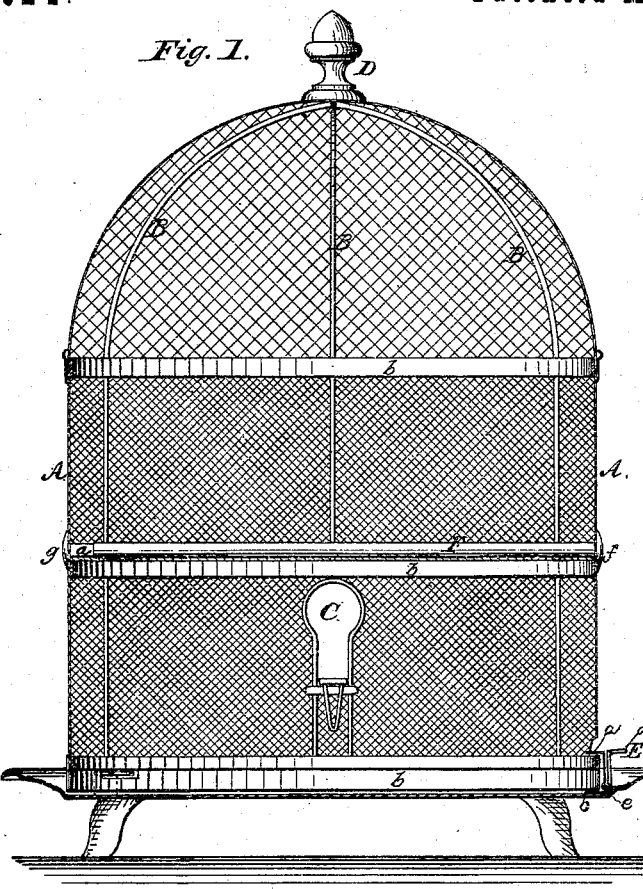
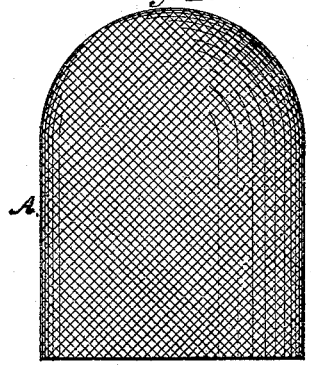
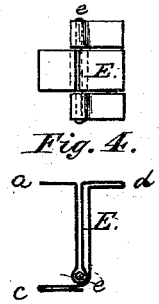
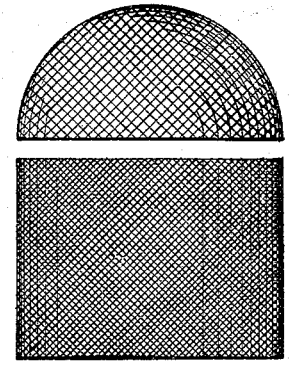
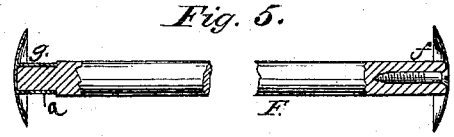
Witnesses:
G. B. Jowles.
W. Burris
Inventor:
George F. J. Colburn

UNITED STATES PATENT OFFICE.

GEORGE F. J. COLBURN, OF WASHINGTON, DISTRICT OF COLUMBIA.

IMPROVEMENT IN BIRD-CAGES.

Specification forming part of Letters Patent No. 177,924, dated May 30, 1876; application filed May 1, 1876.

*To all whom it may concern:*

Be it known that I, GEORGE F. J. COLBURN, of the city of Washington, District of Columbia, have invented certain new and useful Improvements in Bird-Cages; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists of constructing the body of a bird-cage of reticulated material or perforated metal, or its equivalent, for the purpose of protecting the bird from its enemy, the cat, the access of mice and other vermin to the food, and preventing the seed and gravel from being wasted and creating a nuisance by being thrown from the cage—three very desirable qualities for a cage to possess. At the same time the meshes of the material allow the bird to be clearly seen, and afford free access to necessary air and light.

I provide my cage with suitable perches, constructed as hereafter set forth; also, a door and other necessary attachments peculiar to bird-cages.

The body of my cage I attach to the bottom by means of a double-acting catch or fastening of peculiar construction, as hereinafter mentioned.

It will be seen that my cage possesses valuable properties not possessed by cages in general use, constructed of open wire bars, or the lower section only made of reticulated material, in combination with the rest of the body of the cage, made of open wire, as the cage described in my patent of January 25, 1870, such construction having proved ineffectual to accomplish the purpose desired of protecting the bird and preventing the food from being thrown from the cage through the wire openings, which is only accomplished by the body being wholly made of reticulated material. My cage is susceptible of being made quite ornamental as well as useful.

Having described the nature of my invention, I will now proceed to its construction and operation.

I make the body of my cage of any suitable reticulated material, forming the whole body or outside covering, (shown at A,) or a section thereof, into the desired shape by weaving, pressing, or otherwise, so that it will conform to the diameter of a metal or other suitable frame, constructed so as to give strength and preserve its shape. I make this covering of a mesh and material suitable to effect the desired purpose of protecting the bird from danger, and to confine the gravel and seed within the cage, and admit free access of air and light; also, to allow the bird to be clearly seen.

In many cases it may be desirable to vary the size of the mesh as to strength and closeness, to suit the habits and food of the bird confined; therefore I do not confine myself to any particular-sized wire or other material forming the mesh or opening of the same, so long as it will answer my purpose.

The body or case thus formed, when of very fine mesh and material, I place upon and attach it to a suitably-constructed frame or support, as shown at B, to give to it the proper form and strength. When the body or case is made of coarser mesh and stronger material, such a frame or support may be dispensed with, as the strength and rigidity of the material will be sufficient to give proper strength and preserve the desired form without the frame.

The frame B may be made of wire or strips of metal soldered or clamped together in such a manner as to present sufficient strength and given a form most desirable for the purpose, and so constructed as to allow it to be secured to the bottom of the cage by proper fastenings. This frame may be round, oval, square, or otherwise, to suit the peculiar conformation of cage desired. When necessary to use this frame B, I attach the reticulated material to it by clamps, hoops, or soldering, as most desirable, (shown at *b*.)

At different points suitable openings, as shown at C, are made through the covering for the door; and to admit placing the perches and arranging the feed-cups, &c., this covering or case is attached to the top of the frame by the usual device for hanging bird-cages, (shown at D.)

When the case is of sufficient strength to allow of dispensing with the frame, the body of the cage is formed by weaving it into one piece, or, for convenience, may be made and put together in different sections, by clamping, soldering, or bending.

The body of my cage being constructed as above described, I attach it to a bottom, which is formed, in the usual manner, of wood or metal, by means of a double-acting catch, (shown at E.) This catch is made of metal, by bending, punching, or casting, and of such a form as to have two parts. The part $a$, when the body and bottom are brought together, acts as a catch to firmly hold the two portions in position. The part $c$ acts as a lever to throw the part $a$ forward over the lower rim of the body-frame, causing it to lock the parts together. The projection $d$ is for operating the catch in unlocking it. This catch is attached to a pintle, $e$, on which it moves. The pintle is fastened to the bottom.

I use for my cage a perch, F, having a button or its equivalent attached to one end, (letter $f$,) and the other end squared, or so formed as to fit a socket on the inside of a similar button, $g$. These buttons are so constructed as not only to hold and support the perch, but to prevent it turning on its axis, and also to close the orifice through which the perch passes in the covering or body of the cage.

These buttons may be attached to the cage or perch by clamps or otherwise, as desirable. This method of supporting a perch is applicable to all cages in use. Instead of attaching the perch in the usual manner, (slitting the end to make it hold to the wires,) the buttons can be clamped or otherwise fixed to the wires so that the perch can be held in any position required.

Having thus described the nature and construction of my cage, I claim—

1. A bird-cage the body of which is made of reticulated material, as set forth.

2. In combination with the reticulated material, the frame B, for the purpose set forth.

3. The catch E, consisting of the hook $a$, lever $c$, projection $d$, pintle $e$, constructed and operating in the manner and for the purpose specified.

4. The perch F, consisting of a bar having a rectangular tenon, $a$, button $g$, with rectangular socket, and a button, $f$, as described.

In testimony that I claim the foregoing as my own I hereby affix my signature in presence of two witnesses.

GEORGE F. J. COLBURN.

Witnesses:
G. B. TOWLES,
W. BURRIS.